US012614829B2

(12) United States Patent
Deshpande et al.

(10) Patent No.: US 12,614,829 B2
(45) Date of Patent: Apr. 28, 2026

(54) WIDE BAND END LAUNCHER FOR COAXIAL LINE TO CO-PLANAR WAVEGUIDE

(71) Applicant: United States of America as represented by the Administrator of NASA, Washington, DC (US)

(72) Inventors: Manohar Deshpande, Odenton, MD (US); Eleanya Onuma, Springdale, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 56 days.

(21) Appl. No.: 17/941,250

(22) Filed: Sep. 9, 2022

(65) Prior Publication Data

US 2024/0088537 A1 Mar. 14, 2024

(51) Int. Cl.

| | |
|---|---|
| ***H01P 5/08*** | (2006.01) |
| ***H01P 3/00*** | (2006.01) |
| ***H01P 3/06*** | (2006.01) |

(52) U.S. Cl.
CPC ................ *H01P 5/08* (2013.01); *H01P 3/003* (2013.01); *H01P 3/06* (2013.01); *H01P 5/085* (2013.01)

(58) Field of Classification Search
CPC .. H01P 5/085; H01P 5/08; H01P 3/003; H01P 3/006; H01P 3/06; H03H 7/38
USPC ................................................ 333/34, 33, 32
See application file for complete search history.

(56) References Cited

U.S. PATENT DOCUMENTS

2022/0349937 A1* 11/2022 Reid .................... G01R 35/005

* cited by examiner

*Primary Examiner* — Stephen E. Jones
(74) *Attorney, Agent, or Firm* — Heather Goo; Matthew F. Johnston; Trenton J. Roche

(57) ABSTRACT

This application describes an apparatus and system for a Wide band end launcher to convert a signal in a coaxial line to a CPW line. The apparatus uses a transition zone which gradually tapers in two inclined planes from the coaxial line to the CPW line, connecting the central conductor of the coaxial line to the central conductor of the CPW line. In addition, the outer conductor of the coaxial line is connected to the ground plates of the CPW line. This allows for high bandwidth transfers between the two types of lines for accurate measurements and other purposes.

8 Claims, 7 Drawing Sheets

WIDE BAND END LAUNCHER FOR COAXIAL LINE TO CO-PLANAR WAVEGUIDE

ORIGIN OF THE INVENTION

The invention described herein was made by an employee of the United States Government, and may be manufactured and used by or for the Government for governmental purposes without the payment of any royalties thereon or therefor.

BACKGROUND

Technical Field or Field of the Invention

The invention relates to a novel apparatus and method for a wide band end launcher designed to allow a Co-Planar Waveguide to connect to a coaxial line.

Description of the Prior Art

Millimeter wave components are frequently used for modern radar and communication devices. This technology is generally implemented by etching the components needed for these millimeter wave components onto one side of a Silicon wafer. Etching on one side avoids the use of through holes for the through connections. The connections between millimeter wave components are achieved by using a coplanar waveguide which has a low dispersion, and is etched into the wafer. However, in order to test and validate these devices, the co-planar waveguide must be connected to a testing device, such as a Vector Network Analyzer, which has coaxial output ports. Coplanar waveguides can also be used in the creation of Electro-Optical Modulators, where the co-planar waveguide must be connected to a microwave/millimeter wave generator, which often has a coaxial output port.

There are a few different solutions to this problem currently. Two of those solutions are shown in FIGS. 1A-1B. FIG. 1A shows one embodiment of an end launcher wherein the CPW line 101 attaches to the coaxial line 102 in a parallel manner. FIG. 1B shows another version where the coaxial line 102 connects to the CPW line 101 from the bottom. Both of these approaches share a disadvantage in that only small portions of the CPW actually contact the coaxial line and the electrical fields generated in the coaxial line do not align completely with the electric field in the CPW line. This causes less efficient coupling and also results in a fairly narrow bandwidth which can be effectively transmitted. Typical bandwidths for end launchers in the current art vary, with most being in the 1-15 gHz range. Some discussions have looked at devices with up to 40 gHz range. The instant device presents a novel method of end launcher that provides good transmission at high frequencies up to at least 50 gHz.

In view of the foregoing, a novel End Launcher to launch wideband RF signals from a coaxial line on to a CPW line is disclosed. The End launcher provides near full power transmission at frequencies of greater than 40 gHz, up to at least 50 gHz. This launcher can be used in an Electro-Optical Modulator as well.

SUMMARY OF THE DISCLOSURE

It is a feature of illustrative embodiments of the present invention to provide a novel End Launcher to launch wideband RF signals from a coaxial line on to a CPW line is disclosed. The end launcher is formed by gradually tapering the Coaxial line in two inclined planes. On both sides of the coaxial line is tapered such that the coaxial cross-section of the input coaxial line is gradually transformed into the cross-section of a CPW line.

DETAILED DESCRIPTION

Before the present methods and systems for a wide band end launcher is disclosed, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to "a sensor" includes configurations that involve multiple sensors, or multiple types of sensors.

Unless defined otherwise, all technical and scientific terms used herein have the same meanings as commonly understood by one of ordinary skill in the art to which this invention belongs.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps.

Figure 1A:
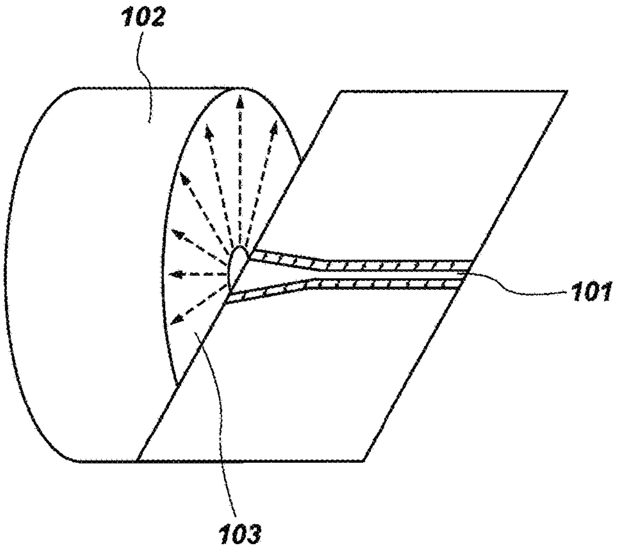
FIG. 1A PRIOR ART
FIG. 1A shows a prior CPW/coaxial adapter wherein the CPW line attaches directly to the coaxial line.
Figure 1B:
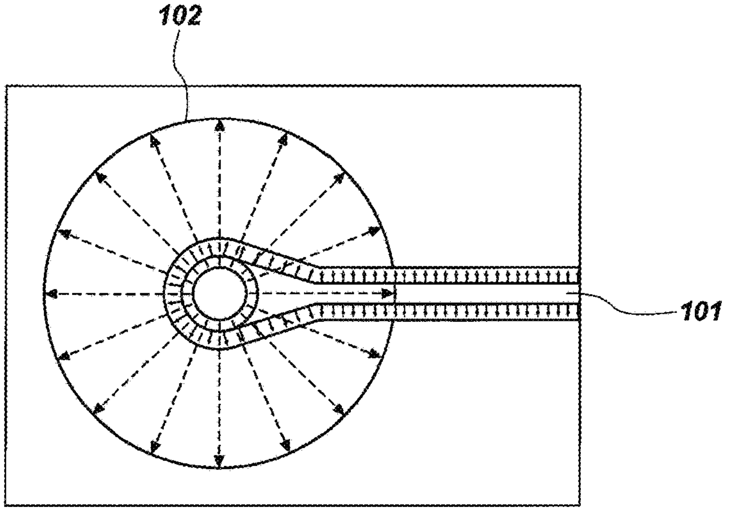
FIG. 1B PRIOR ART
FIG. 1B shows a prior CPW/coaxial adapter wherein the coaxial line attaches to the CPW line from below

The Wide Band End Launcher is a design for realizing an effective coaxial to Co-Planar Waveguide (CPW) connector. In order to efficiently couple the waves from a coaxial line to CPW line, the electric field lines in the coaxial line and the CPW line need to be aligned at the plane where the two lines intersect. Current CPW to coaxial connectors are shown in FIGS. 1A and 1B. FIG. 1A shows an end launcher wherein the CPW line 101 attaches to the coaxial line 102 in a parallel manner, wherein the two lines touch only in a minimal location 103, resulting in a poor coupling between the CPW line 101 and the coaxial line 102. FIG. 1B shows another version where the coaxial line 102 (underneath) connects to the CPW line 101 from the bottom. While the coaxial line 102 and the CPW line 101 are in more contact, they are perpendicular to each other, and as a result, again, only a very small part of the field lines in the coaxial line align with the electric field lines in the CPW line. This results in poor coupling between the two waveguides in both FIG. 1A and FIG. 1B.

In order to solve the problem of a Co-planar waveguide connecting to a coaxial line, the electric fields must align at the interface between the two lines. A Co-planar waveguide is compose of a median metallic strip separated by two narrow slits from a ground plate. A coaxial line, however, is circular, with a central conductor and an outer conductor. The difference in shapes causes electric field lines to be unaligned at a hard interface.

Figure 2:
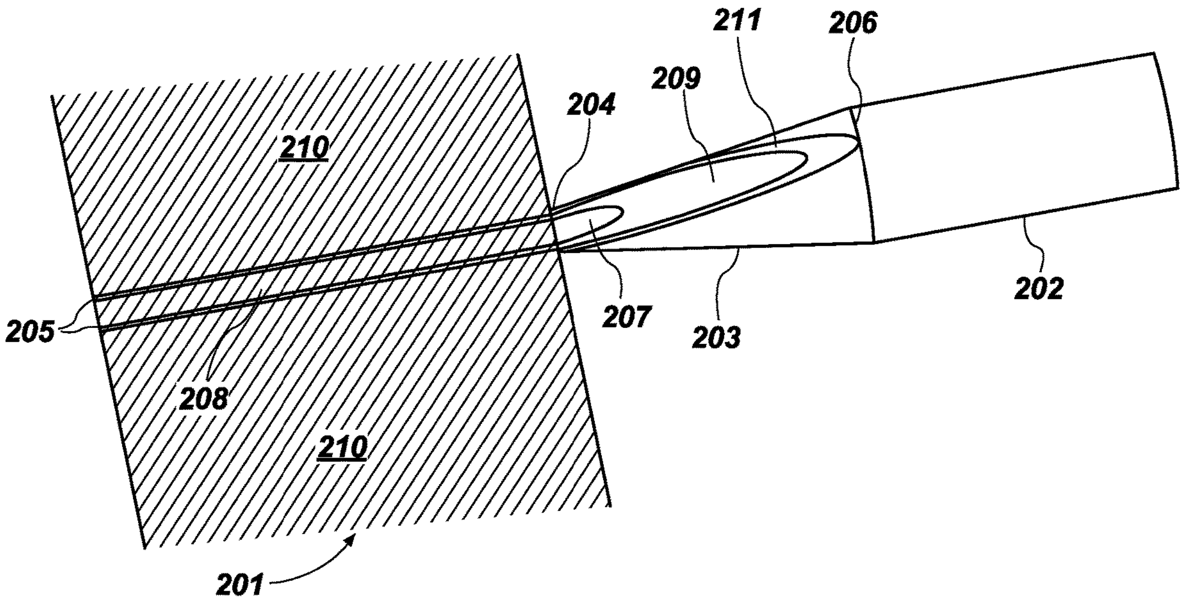
FIG. 2 shows one embodiment of a novel CPW/coaxial adapter showing a CPW region, coaxial region, and transition area.

FIG. 2 shows a novel wide band end launcher with a Coaxial to CPW line transition. In this embodiment of the wide band end launcher, the end launcher comprises a CPW end 201 and a coaxial end 202. The CPW end 201 connects to a Co-Planar waveguide, and the coaxial end 202 connects to a coaxial line. The end launcher also comprises a transition area 203. The geometry of the transition area 203 is such that the area of the conductor gradually changes shape. The CPW side 204 of the transition area is as narrow as the CPW line itself. The coaxial side 206 is in the shape of a coaxial cable. The transition area 203 gradually changes shape by tapering from the coaxial line in two inclined planes (one above and one below) such that the center conductor of the coaxial line 207 completely aligns with the center conductor (the inner rectangular strip) of the CPW line 208. The interior insulator 209 of the transition area 203 corresponds to the slots in the CPW line 205 and the insulator in the coaxial line. In addition, the outer conductor of the coaxial line 211 aligns with the two ground planes 210 of the CPW line. The outer conductor of the coaxial line tapers in the outer conductor area 211 to connect with the ground of the CPW line 210 at the connection points 204. This allows the electric fields to align throughout the launcher and gives a maximum band width in the transmission between the CPW line and the coaxial line.

Figure 3:
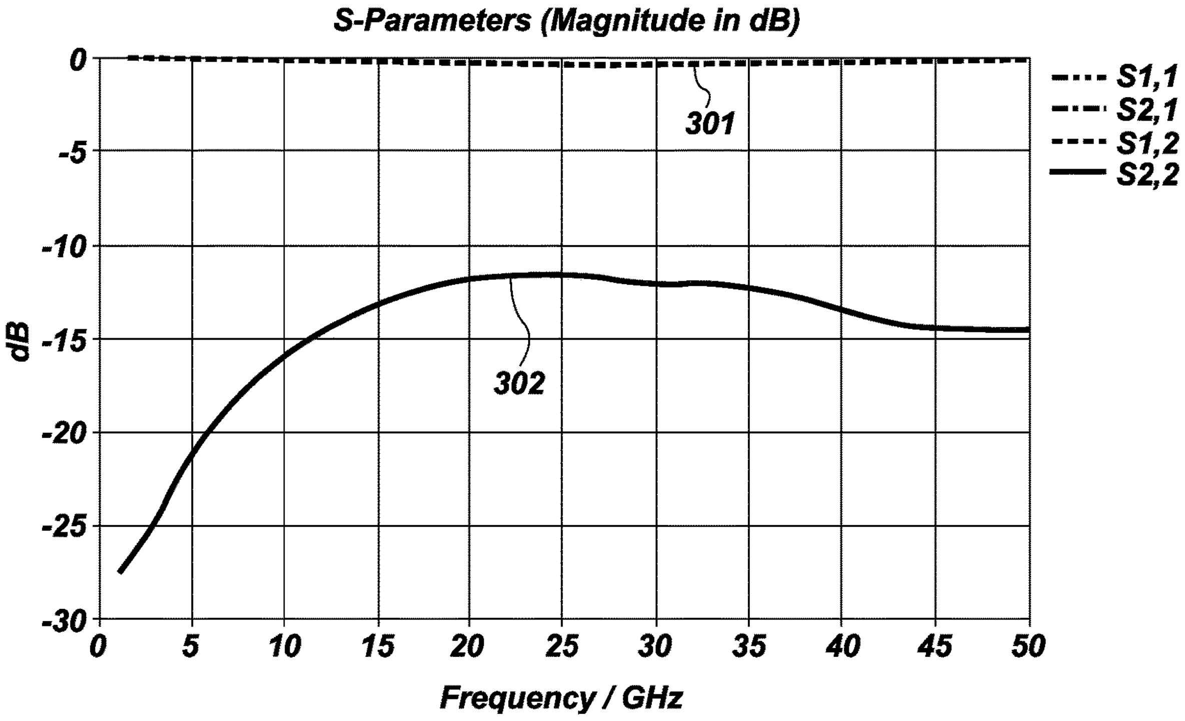
FIG. 3 shows a graph of the s-coefficient of the CPW/coaxial adapter.

FIG. 3 shows a graph of the S-parameters which are measures of the transfer of power and the reflection of power at frequencies between 0 and 50 gHz. The instant invention has a very efficient transfer of power. In determining the S parameters, port 1 is the coaxial port while port 2 is the CPW port. S1,1 is the power reflected at the coaxial port. S2,2 is the reflection of power at the CPW port. S2,1 is the power transferred from the coaxial port to the CPW port. S1,2 is the power transferred from the CPW port to the coaxial port. Line 301 shows the power transferred in decibels S1,2 and S2,1 follow the same line 301. The power transmitted in dB can be calculated by the logarithm of the ratio of power transmitted to power input. As the ratio of power transmitted to power input approaches 0, the dB value approaches 0. As such, an S-parameter close to 0 shows that nearly all the power input is transmitted across the port, whichever direction the power is going. Line 301 shows that the power transmitted is nearly the same as the power input.

FIG. 3 also shows line 302, shows S1,1 and S2,2. The S1,1 parameter is determined by the power reflected at the coaxial port. S2,2 is determined by the power reflected at the CPW port. These parameters can be calculated by the logarithm of the ratio of power reflected to power input. As dB are a logarithmic scale, line 302 shows that the power reflected is much less than the input power. The power reflected does increase as the frequency increases, but as can be seen in line 301, the majority of the power is still transmitted.

Figure 4A:
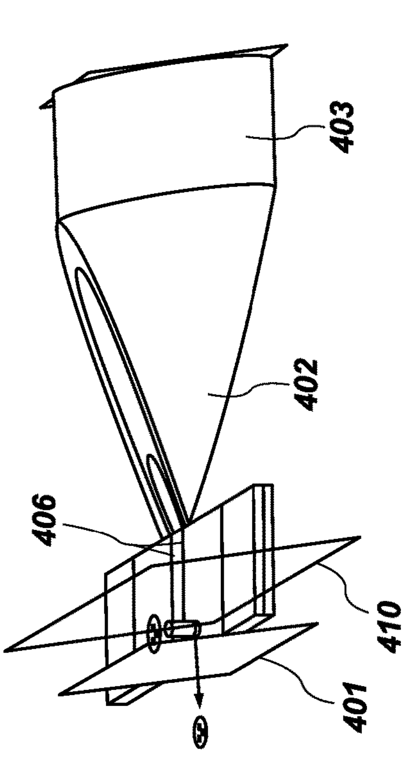
FIG. 4A shows one embodiment of a novel CPW/coaxial adapter showing a cross section of the adapter at the CPW region.
Figure 4B:
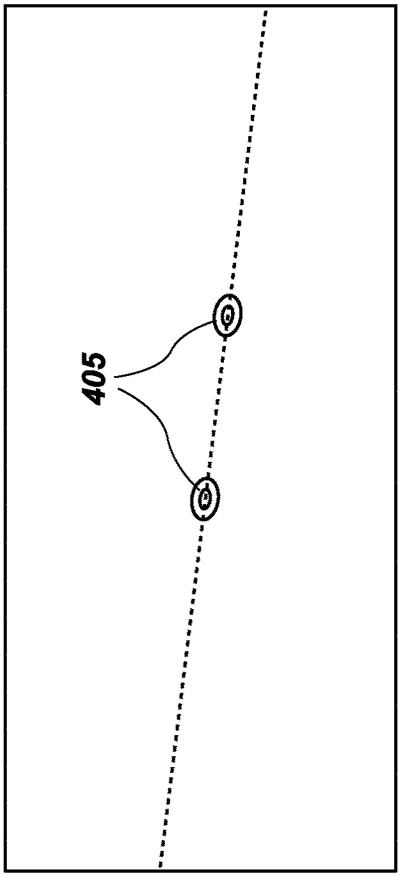
FIG. 4B shows the electric field in the CPW/coaxial adapter at the cross-section in FIG. 4A.

FIGS. 4A-4J show the electric fields in the CPW line, the transition area, and the coaxial cable. FIG. 4A shows the coaxial/CPW connector, showing the CPW end 401, the transition area 402 and the coaxial end 403. FIG. 4A also shows a cut away 404 in the CPW end. The electric field of the cutaway is shown in FIG. 4B, showing a representation of the electric field 405 in the transition to the CPW line 406. This is shown by the two field areas 405 in FIG. 4B, showing the main electric field in the CPW line, conducted along the slots of the CPW line.

Figure 4C:
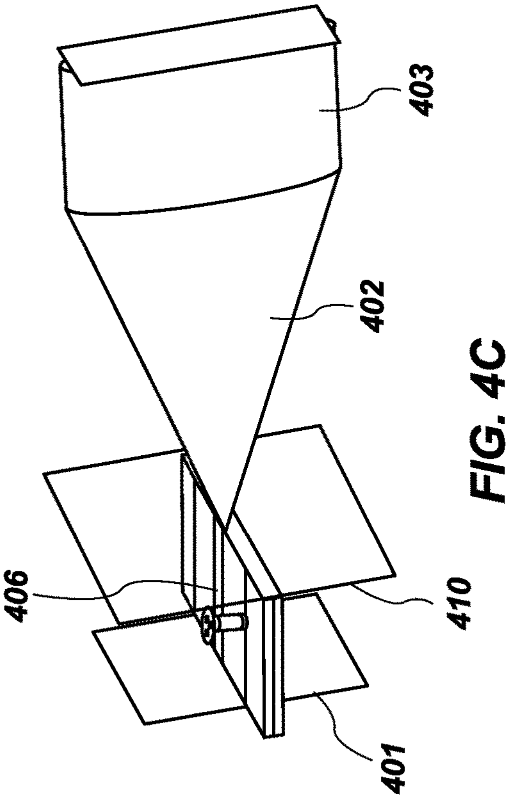
FIG. 4C shows one embodiment of a novel CPW/coaxial adapter showing a cross section of the adapter at the interface of the CPW line and the transition area.
Figure 4D:
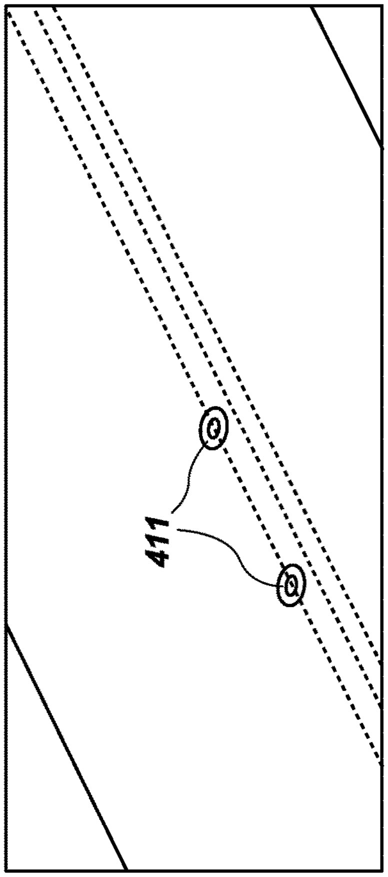
FIG. 4D shows the electric field in the CPW/coaxial adapter at the cross-section in FIG. 4C.

FIG. 4C shows the end launcher with a second cutaway 410 at the interface of the CPW end 401 and the transition area 402. The electric fields 411 of this second cutaway 410 are shown in FIG. 4D. As can be seen in FIG. 4D, the electric fields 411 at the beginning of the transition area are nearly the same as the electric fields in the CPW line shown in FIG. 4B. These electric fields are shown as being in slot areas in the CPW line 406 and the transition area 402. The transition area at this point is essentially the same as the CPW line.

Figure 4E:
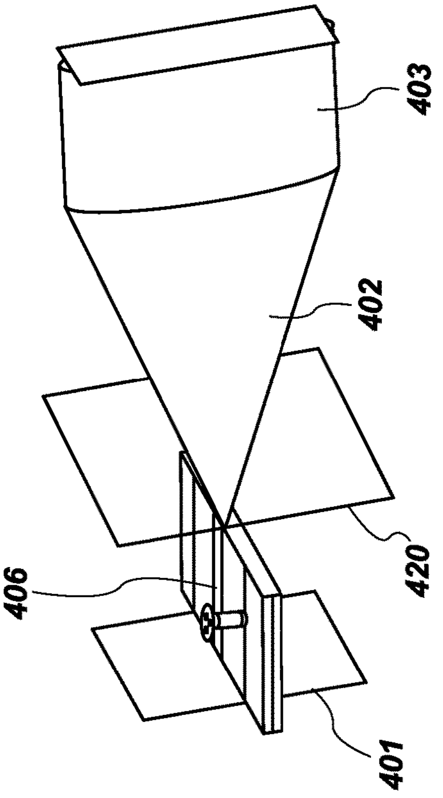
FIG. 4E shows one embodiment of a novel CPW/coaxial adapter showing a cross section of the adapter in the transition area near the CPW line.
Figure 4F:
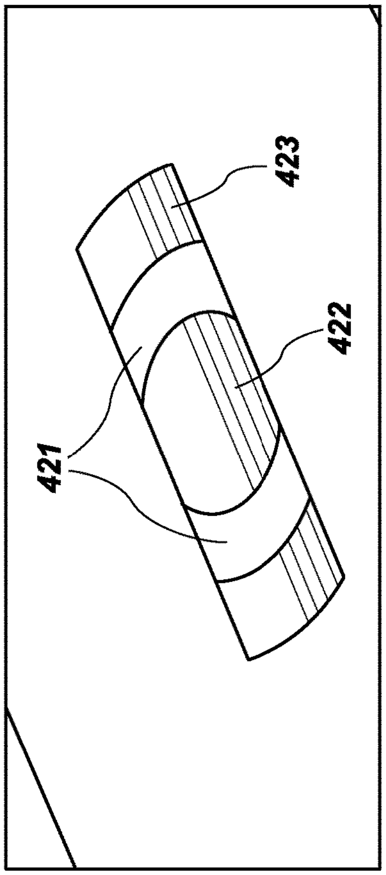
FIG. 4F shows the CPW/coaxial adapter at the cross-section in FIG. 4E.

FIG. 4E shows the end launcher with a third cutaway 420 which is located within the transition zone 402, closer to the CPW end 401 of the end launcher. FIG. 4F shows the transition area, where the electric field is located in area 421, the space between the central conductor 422 and the outer conductor 423. The inner conductor 422 and outer conductor 423 are beginning to change shape to be more in line with a coaxial cable.

Figure 4G:
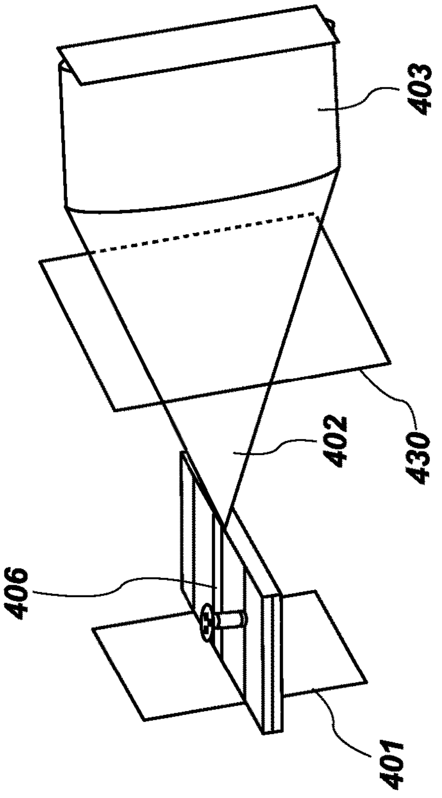
FIG. 4G shows one embodiment of a novel CPW/coaxial adapter showing a cross section of the adapter in the transition region near the coaxial line.
Figure 4H:
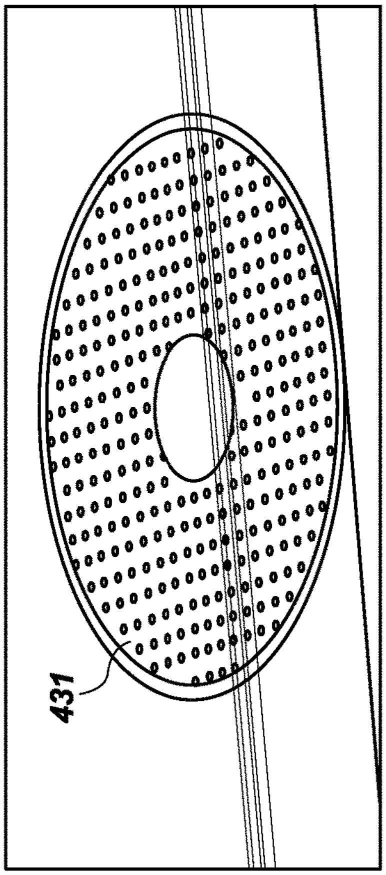
FIG. 4H shows the electric field in the CPW/coaxial adapter at the cross-section in FIG. 4G.
Figure 4J:
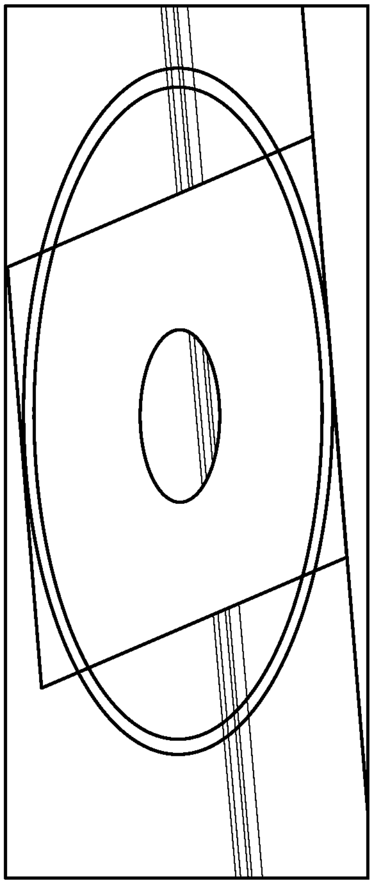
FIG. 4J shows the CPW/coaxial adapter at the cross-section in FIG. 4I.
Figure 4I:
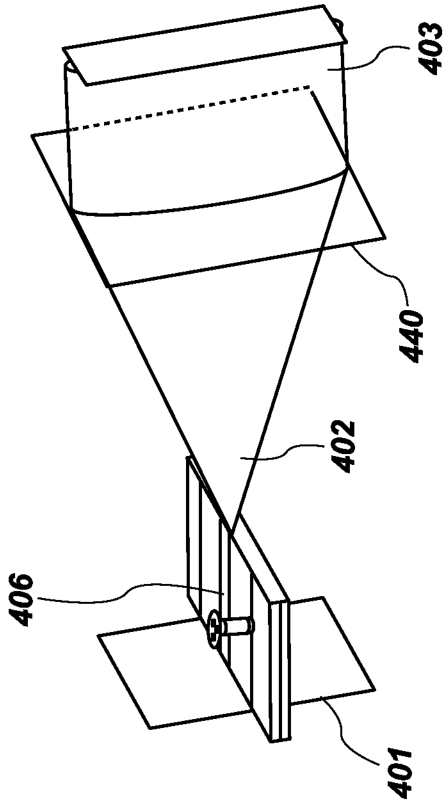
FIG. 4I shows one embodiment of a novel CPW/coaxial adapter showing a cross section of the adapter at the coaxial region.

FIG. 4G shows the end launcher with a fourth cutaway 430 which is still in the transition zone 402, but this time located closer to the coaxial end 403. The electric field 431 at cutout 430 is shown in FIG. 4H. In FIG. 4H it can be seen that the electric field is beginning to appear very similar to the electric field in a coaxial cable. Finally, FIG. 4I shows the end launcher with cutout 440, and the cutout at 440 is shown in FIG. 4J. The electric field here is fully as if it were in a coaxial cable. The electric field within the end launcher gradually changes from that of the CPW line 401 to that of the coaxial line 402. There is no sudden transition from one line to the other, but instead a gradual transition in the transition area 403, preventing a sudden shift in the electric field and allowing for a wider bandwidth to be transmitted between the CPW line and coaxial line (or vice versa). This allows for more efficient operation of any device requiring both the CPW line and a standard coaxial line, and a more efficient transmission of power, as seen in FIG. 3. It should be understood that the method can be used to adapt lines which are similar to standard CPW lines to lines which are similar to standard coaxial lines, regardless of the specific standardization of the lines.

Figure 5:
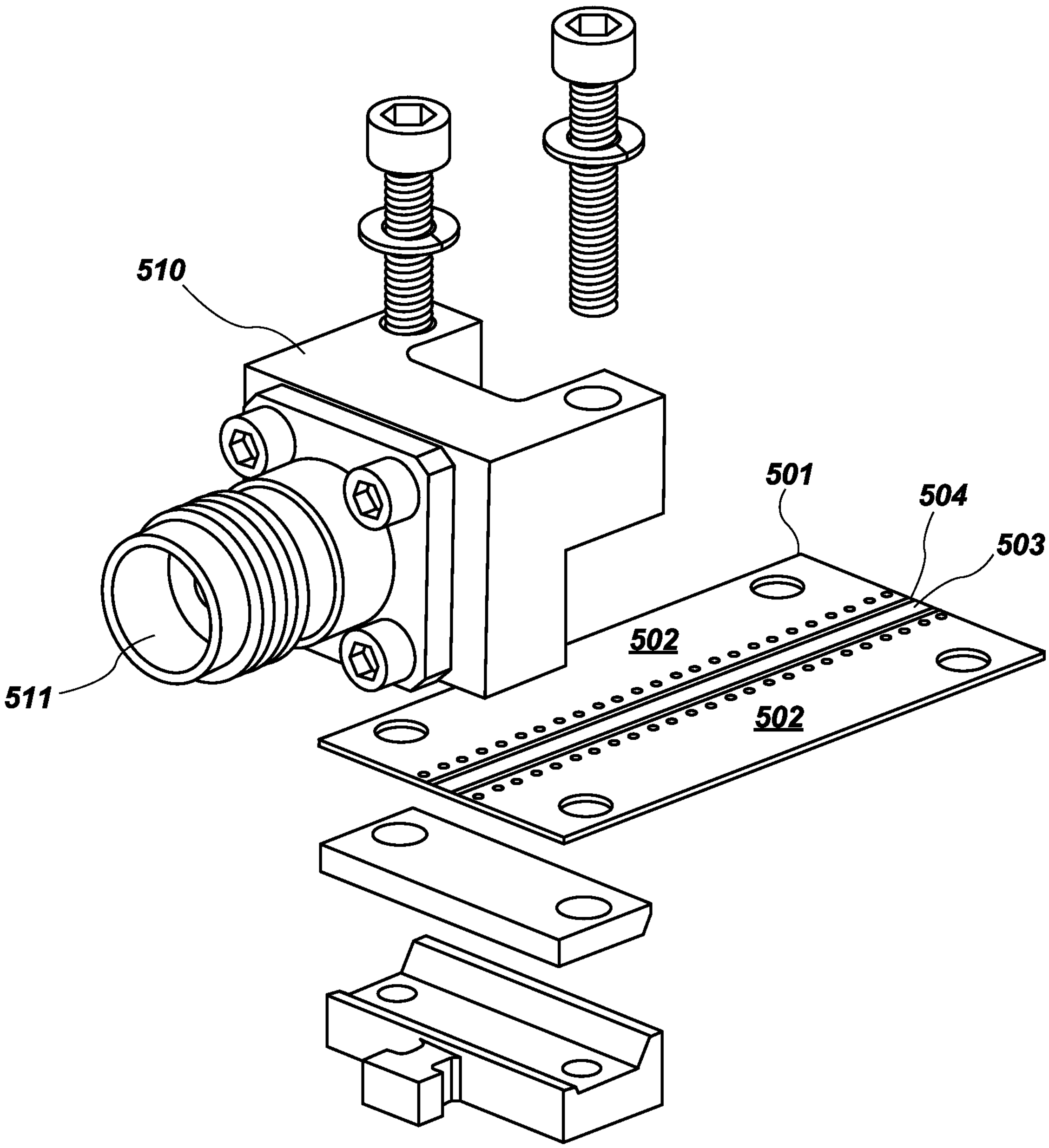
FIG. 5 shows one embodiment of the CPW/coaxial adapter as an assembly, showing the CPW line and the coaxial connector to secure to the coaxial line. s

FIG. 5 shows one embodiment of an end launcher taken apart. The CPW end 501 is a flat plate with the ground plates 502 on the ends and the inner plate 503 with two grooves between 504. The coaxial end 510 has the transition area within it, arranged so that the transition area attached to the coaxial connector 511 has the two connections attached to the CPW end 501. The CPW end 501 can be connected to a CPW line and the coaxial end 510 is secured to a coaxial connector 511, allowing for a CPW line to connect to a coaxial line.

The instant disclosure allows for connections between a coplanar waveguide with low dispersion and a coaxial output port. This connection may be used for a variety of purposes, such as connecting CPW components to a testing device with coaxial output ports, or the connection of CPW lines with coaxial lines in a variety of other situations. The instant disclosure improves on the previous methods for connecting CPW lines to coaxial lines by using a tapered transition area made of a conductor. The transition area connects the outer part of the coaxial cable to the ground plates in the CPW line and the inner part of the coaxial cable to the rectangular center plate of the CPW line. The gradual transition in shape (using two inclined planes) allows for the electric field to gradually change across the transition area with two inclined planes. In one embodiment this allows for a bandwidth of 0-50 gHz in the waves to be transmitted between the two mediums.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed:

1. An end launcher designed to interface between a coaxial line and a co-planar waveguide (CPW) line; said end launcher comprising:

a coaxial end, which comprises the coaxial line, wherein the coaxial end is arranged as a coaxial cable with a center conductor in the center of the coaxial cable and an outer conductor on the exterior of the coaxial cable;

a co-planar waveguide end, wherein the CPW line is etched on the top surface of a silicon wafer and comprises a center conductor, two ground plates, one located on either side of the center conductor, and two slots, one located between the center conductor and each of the ground plates;

a transition region, the transition region comprising a conductor, wherein the shape of the conductor gradually transitions from the two slots in the CPW line to the coaxial line to align an electric field at the transition region between the coaxial cable and co-planar waveguide end;

wherein the end launcher further comprises an additional transition zone in the transition region, located closer to the coaxial end with the electric field with a gradual transition in the transition area, preventing a sudden shift in the electric field and providing a wider bandwidth to be transmitted between the CPW line and coaxial line.

2. The end launcher of claim 1 wherein the transition region is gradually tapered in two inclined planes such that the center conductor of the coaxial line completely aligns with the center conductor of the co-planar waveguide line.

3. The end launcher of claim 2 wherein the gradual tapering of the transition region also causes the outer conductor of the coaxial line to align with the two ground planes of the co-planar waveguide line.

4. The end launcher of claim 1 wherein the bandwidth of an electrical signal transmitted is at least 50 gHz.

5. The end launcher of claim 1 wherein the bandwidth of an electrical signal transmitted is between 1-50 gHz.

6. A system for transmitting a signal from a co-planar waveguide to a coaxial cable, said system comprising:

a coplanar waveguide etched on one side of a silicon wafer, comprising a center conductor plate and two ground plates separated by two grooves in the silicon wafer, a coaxial cable comprising an outer conductor which can be connected to ground and an inner conductor;

an end launcher comprising a transition area, wherein the transition area changes shape from a coaxial line at one end narrowing to align with the center conductor of a CPW line at the other end;

wherein the inner conductor of the coaxial cable is connected through the transition region to the center conductor of the CPW line and wherein the outer conductor of the coaxial cable is connected to the outer ground regions of the coplanar waveguide to align an electric field at the transition region between the coaxial cable and co-planar waveguide end;

wherein the end launcher further comprises an additional transition zone in the transition region, located closer to the coaxial end with the electric field with a gradual transition in the transition area, preventing a sudden shift in the electric field and providing a wider bandwidth to be transmitted between the CPW line and coaxial line.

7. The system of claim 6 wherein the bandwidth of the signal transmitted is between 1 and 50 gHz.

8. The system of claim 6 wherein the bandwidth of the signal transmitted is at least 50 gHz.

* * * * *